United States Patent Office 2,873,301
Patented Feb. 10, 1959

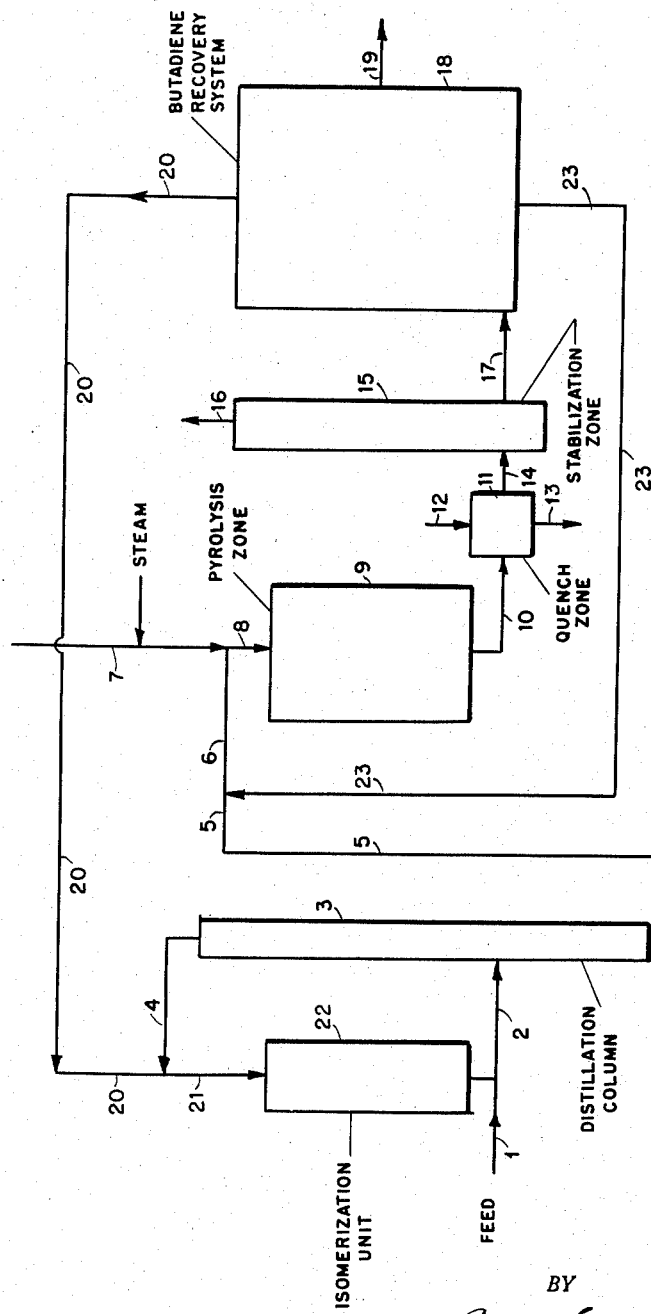

2,873,301

THERMAL PROCESS FOR PREPARING BUTADIENE FROM BUTENE-2

Willis C. Keith, Lansing, Ill., assignor to Sinclair Refining Company, New York, N. Y., a corporation of Maine Application April 9, 1956, Serial No. 577,157

6 Claims. (Cl. 260—680)

My invention relates to the production of butadiene. It has heretofore been proposed to prepare butadiene by passing normal butenes in admixture with steam in vapor phase and at elevated temperatures of the order of 1300° F. into contact with any of a wide variety of catalysts. The catalysts which have been employed have isomerizing as well as dehydrogenating activity, and hence tend to maintain equilibrium between the butene-1 and the butene-2 (cis and trans) which are undergoing reaction to form butadiene.

My experimental work has shown that a butene-2 can be dehydrogenated to form butadiene in much higher yield than can butene-1. Therefore, in preparing butadiene by dehydrogenating a normal butene, it is preferred to employ butene-2 as a starting material and to conduct the dehydrogenation under conditions leading to a minimum amount of isomerization of butene-2 to butene-1. Hence, the process which I have invented involves thermally or non-catalytically dehydrogenating butene-2 which is in a high state of purity, particularly with respect to butene-1 content. The dehydrogenation of the butene-2 in accordance with my invention is carried out at an elevated temperature within the range from 1200° F. to 1700° F., preferably 1300° F. to 1500° F., the period of time during which the butene-2 is heated at the elevated temperature generally being from 0.01 second to 0.2 second and preferably from 0.05 second to 0.1 second. As is customary in the art in converting normal butene to butadiene, the butene-2 is decomposed at approximately atmospheric pressure and while it is admixed with a large amount of an inert diluent gas, generally from 5 to 40 moles of diluent gas per mole of butene-2 and preferably from 15 to 25 moles of diluent gas per mole of butene-2. Steam is the preferred diluent gas. When my process is carried out, butene-2 is isomerized to butene-1 as well as dehydrogenated to butadiene, and the reaction conditions are adjusted so that the conversion based upon disappearance of normal butenes does not exceed 70 percent.

After the butene-2 has been dehydrogenated to produce the desired butadiene, the hot gaseous mixture leaving the converter is quickly cooled, as by quenching, this also being conventional in producing butadiene from normal butenes. The butadiene in purified form can then be recovered from the quenched stream by extractive distillation using acetone or furfural, for example. Other methods can also be employed, such as azeotropic distillation with ammonia or reaction with cuprous ammonium acetate. Butene-2 present in the quenched stream can be recovered by fractionation and returned to the thermal dehydrogenation step. Butene-1 present in the quenched stream can also be recovered by fractional distillation and isomerized to butene-2 in very high yield using any of a wide variety of methods which are known and which have been described in the art. Note, for example, Industrial and Engineering Chemistry 45, 551–565 (1953). Butene-2 formed by the isomerization of butene-1 can be used as feed in my process.

The following example illustrates various embodiments which fall within the scope of my invention.

EXAMPLE

Butene-2 (cis and trans) having a purity of 99 percent in admixture with steam was passed through a hot tube reactor following which the effluent from the tube was quenched with water and the reaction products analyzed. The reaction conditions are set forth in Table I. The reaction temperatures reported in the table are average temperatures taken from the temperature profile of the hot tube, and the contact times are calculated ones based upon the free space of the hot tube and the volume of the gases (steam and butene-2) introduced into the reactor at the average reactor temperature.

*Table 1*

| Run No. | 1 | 2 | 3 | 4 | 5 | 6 | 7 |
|---|---|---|---|---|---|---|---|
| Reaction temp., °F. | 1,335 | 1,405 | 1,470 | 1,520 | 1,590 | 1,300 | Ca. 1,270 |
| Contact time, sec. | 0.12 | 0.11 | 0.11 | 0.11 | 0.10 | 0.12 | 0.12 |
| Mole ratio steam to butene-2 | 20 | 20 | 20 | 20 | 20 | 20 | 20 |
| Conversion (A) | 25.4 | 26.0 | 52.9 | 65.3 | 91.0 | 15.2 | 22.1 |
| Conversion (B) | 49.4 | 40.2 | 56.5 | 69.4 | est. 92 | 28.9 | 58.0 |
| Product per 100 moles butene-2 decomposed, moles: | | | | | | | |
| Butadiene | 40 | 45 | 37 | 39 | 22 | 37.7 | 18.4 |
| Butene-1 | 49 | 35 | 6 | 6 | Ca. 1 | 47.5 | 61.9 |
| Product per 100 moles butene-2 decomposed, moles to other than butene-1: | | | | | | | |
| Butadiene | 78.5 | 69.2 | 39.6 | 41 | 22.0 | 72 | 48.2 |
| Product, Wt. percent of butene-2 feed: | | | | | | | |
| Butadiene | 19.2 | 17.4 | 20.2 | 25.9 | 19.3 | 10.5 | 10.3 |
| Butene-1 | 24.0 | 14.2 | 3.6 | 4.1 | {------} | (C) | 35.9 |
| Butene-2 | 50.6 | 59.8 | 43.5 | 30.6 | { 9.0 } | { 84.8 } | 42.0 |

(A) Based on disappearance of normal butenes.
(B) Based on disappearance of butene-2.
(C) Split about 71.1 butene-2 and 13.7 butene-1.

It will be noted that run No. 5 does not conform to my invention inasmuch as in it the conversion based upon disappearance of normal butenes exceeds 70 percent.

Table II sets forth the experimental conditions and results obtained in similar experiments employing 99 percent purity butene-1 as feed.

Table II

| Run No. | 1 | 2 | 3 | 4 | 5 | 6 | 7 | 8 | 9 | 10 |
|---|---|---|---|---|---|---|---|---|---|---|
| Reaction temp., °F | 1,340 | 1,490 | 1,540 | 1,425 | 1,430 | 1,485 | 1,345 | 1,495 | 1,495 | 1,495 |
| Contact time, sec | 0.165 | 0.13 | 0.11 | 0.16 | 0.10 | 0.12 | 0.059 | 0.068 | 0.068 | 0.068 |
| Mole ratio steam to butene-1 | 20 | 20 | 20 | 20 | 20 | 20 | 20 | 20 | 40 | 80 |
| Conversion (D) | 51.7 | 92.9 | 97.5 | 78.3 | 60.3 | 89.4 | 22.8 | 84.1 | 85.1 | 85.1 |
| Product per 100 moles butene-1 decomposed, moles: | | | | | | | | | | |
| Butadiene | 21.0 | 17.0 | 16 | 25 | 27 | 21 | 25 | 24 | 19.3 | 22.5 |
| Product, Wt. percent of butene-1 feed: | | | | | | | | | | |
| Butene-1 | 48.3 | 7.1 | 2.5 | 19.8 | 26.1 | 10.6 | 73.6 | 15.9 | 14.9 | 14.9 |
| Butene-2 | | | | 1.9 | 3.6 | | 3.6 | | | |
| Butadiene | 10.5 | 15.1 | 14.8 | 18.8 | 15.7 | 18.1 | 5.4 | 19.6 | 15.9 | 18.5 |

(D) Based on disappearance of normal butenes.

It will be noted that where butene-1 was used as the feed the amount of butene-2 produced was not significant. A comparison of Tables I and II with respect to the amounts of butadiene produced per 100 moles of butene feed decomposed (to materials other than butene-1 in the case of butene-2), shows that where the conversion is less than 70 percent the amount of butadiene produced is considerably larger where butene-2 is employed as a feed rather than butene-1.

Various modifications can be made in the procedures described in Table I to provide other embodiments which fall within the scope of my invention. For example, although in obtaining the data of Table I a feed which was substantially pure butene-2 was used, a butene-2 feed of somewhat less purity can also be utilized. In general, the gaseous mixture pyrolyzed in accordance with my invention will be a $C_4$ hydrocarbon fraction which contains at least 80 mole percent of n-butenes, at least 80 mole percent of the normal butenes being butene-2 (cis and trans). Impurities in the $C_4$ hydrocarbon fraction, other than normal butenes, will be largely normal butane, which has a boiling point corresponding closely to those of the normal butenes. $C_4$ hydrocarbon fractions of sufficient purity with respect to butene-2 content for use in my process can be prepared in accordance with procedures which are well known in the art. Thus, a conventional butane-butylene stream containing isobutane, isobutylene, butylene-1, normal butane and butylene-2 can be separated into an overhead and a bottoms fraction using a distillation column. The bottoms fraction contains normal butane and butylene-2 and is subjected to extractive distillation with furfural, butylene-2, being recovered from the stripper.

My process possesses advantage in that when it is carried out the butene-2 is changed to the desired butadiene and also to butene-1, a compound which can be conveniently isomerized to butene-2 to serve as a further quantity of feed in my process. The conversion of butene-1 to butene-2 can be carried out using various catalysts at moderate temperatures. Among the better catalysts are alumina (e. g. Alarco Grade A activated alumina), alumina on clay, bauxite, sulfonic acids, chromium oxide on alumina, nickel, 70 percent perchloric acid, orthophosphoric acid, phosphoric acid on diatomaceous earth and silica-alumina or silica-alumina-magnesia cracking catalysts. Temperatures of the order of 300° F. to 600° F. and liquid hourly space velocities (volume of butene-1 per volume of catalyst per hour) of the order of 2 can be utilized. For example, in order to convert butene-1 to butene-2, the butene-1 can be passed at approximately 400° F. into contact with silica gel, activated clay, anhydrous aluminum sulfate or phosphoric acid on pumice. Also, if desired, butene-2 can be prepared from butene-1 by passing the butene-1 into contact with silica-alumina-magnesia cracking catalyst or bauxite at 400° F. The equilibrium between butene-1 and butene-2 with respect to the percentage of butene-2 is more favorable at lower temperatures.

The accompanying drawing is a simplified flow diagram illustrating how my process can be carried out. In the drawing a $C_4$ hydrocarbon fraction which is essentially a mixture of butene-1 and butene-2 is fed through lines 1 and 2 into distillation column 3. Butene-1 is removed overhead through line 4 and butene-2 is removed as bottoms through lines 5 and 6. The butene-2 is admixed with steam flowing through line 7 and the mixture of butene-2 and steam passes by means of line 8 into pyrolysis zone 9. Exit gases from the pyrolysis zone pass by means of line 10 into quench zone 11, wherein water introduced through line 12 is employed as a quenching medium. Water is removed through line 13 and hydrocarbon passes by means of line 14 into stabilization column 15, overhead from which through line 16 hydrogen and hydrocarbons having less than 4 carbon atoms are removed. The bottoms from stabilization column 15 are removed through line 17 and pass into a butadiene recovery system 18 from which purified butadiene is removed through line 19. Butene-1 recovered in the butadiene recovery system passes by means of lines 20 and 21 into butene-1 isomerization unit 22. Butene-1 overhead from distillation column 3 is also introduced into this isomerization unit as shown. Butene-2 recovered in the butadiene recovery system is introduced into the pyrolysis zone 9 by means of lines 23, 6 and 8.

I claim:

1. A method for the manufacture of butadiene which comprises heating in the absence of a catalyst a $C_4$ hydrocarbon fraction to a temperature within the range from 1200° F. to 1700° F. while the hydrocarbon fraction is in admixture with from 5 to 40 moles of an inert diluent gas per mole of butene-2 for a period of time such that the conversion, based upon the disappearance of normal butenes, does not exceed 70 percent, said hydrocarbon fraction containing at least 80 mole percent of normal butenes and at least 80 percent of the normal butenes being butene-2.

2. The method of claim 1 wherein said inert diluent gas is steam.

3. The method of claim 1 wherein said hydrocarbon fraction is butene-2 of about 98 percent purity.

4. A method for the manufacture of butadiene which comprises heating in the absence of a catalyst a $C_4$ hydrocarbon fraction to a temperature within the range from 1300° F. to 1500° F. while the hydrocarbon fraction is in admixture with from 15 to 25 moles of an inert diluent gas per mole of butene-2 for a period of time such that the conversion, based upon the disappearance of normal butenes, does not exceed 70 percent, said hydrocarbon fraction containing at least 80 mole percent of normal butenes and at least 80 percent of the normal butenes being butene-2.

5. The method of claim 4 wherein said inert diluent gas is steam.

6. The method of claim 4 wherein said hydrocarbon fraction is butene-2 of about 98 percent purity.

References Cited in the file of this patent

UNITED STATES PATENTS 2,322,122    Frolich et al.    June 15, 1943
2,388,078    Reeves    Oct. 30, 1945